United States Patent [19]

Rieder et al.

[11] Patent Number: 4,628,609
[45] Date of Patent: Dec. 16, 1986

[54] INCREMENTAL MEASURING AND MACHINE CONTROL SYSTEM

[75] Inventors: Heinz Rieder, St. Pantaleon; Max Schwaiger, Ostermiething, both of Austria

[73] Assignee: RSF-Elektronik Gesellschaft m.b.H., Tarsdorf, Austria

[21] Appl. No.: 750,899

[22] Filed: Jul. 1, 1985

[30] Foreign Application Priority Data

Jul. 6, 1984 [AT] Austria .................... 2175/84

[51] Int. Cl.$^4$ .................................. G01B 11/02
[52] U.S. Cl. ........................ 33/125 C; 250/237 G
[58] Field of Search ............ 33/125 R, 125 A, 125 C; 250/237 G; 356/375

[56] References Cited

U.S. PATENT DOCUMENTS

| 4,078,173 | 3/1978 | Fultz | 250/237 G |
|---|---|---|---|
| 4,158,509 | 6/1979 | Rieder et al. | 33/125 C |
| 4,385,836 | 5/1983 | Schmitt | 33/125 C |
| 4,400,890 | 8/1983 | Ohkubo et al. | 33/125 C |
| 4,403,859 | 9/1983 | Ernst | 33/125 C |
| 4,459,750 | 7/1984 | Affa | 33/125 C |
| 4,519,140 | 5/1985 | Schmitt | 33/125 C |

FOREIGN PATENT DOCUMENTS

| 3245357 | 6/1984 | Fed. Rep. of Germany . |
|---|---|---|
| 2065872 | 6/1983 | United Kingdom . |
| 664023 | 5/1979 | U.S.S.R. .................... 33/125 A |

Primary Examiner—Richard R. Stearns
Attorney, Agent, or Firm—Karl F. Ross; Herbert Dubno

[57] ABSTRACT

The incremental measuring and machine control system comprises an incremental scale and an auxiliary track extending beside said scale along the same and provided with at least one reference mark in register with a predetermined point of said scale. A scanning unit comprises scanning means for scanning said scale and for generating analog signals in response to the scanning of said scale. The scanning unit comprises additional scanning means for scanning said reference marks and for generating reference signals in response to the scanning of the reference marks. A processor derives digital signals for said analog signals and delivers the digital signals to a counting or display unit which is controlled by said reference signals or by signals derived therefrom. To eliminate the need for separate limit switches or other limiting means in the machine control system, the auxiliary track is provided with control marks and the processor comprises a processor for distinguishing between the reference signals and between control signals generated by said additional scanning means in response to the scanning of said control marks. Said control signals can then be delivered to a control output of the processor and used to control switches for arresting or reversing drive means of the machine control system.

11 Claims, 1 Drawing Figure

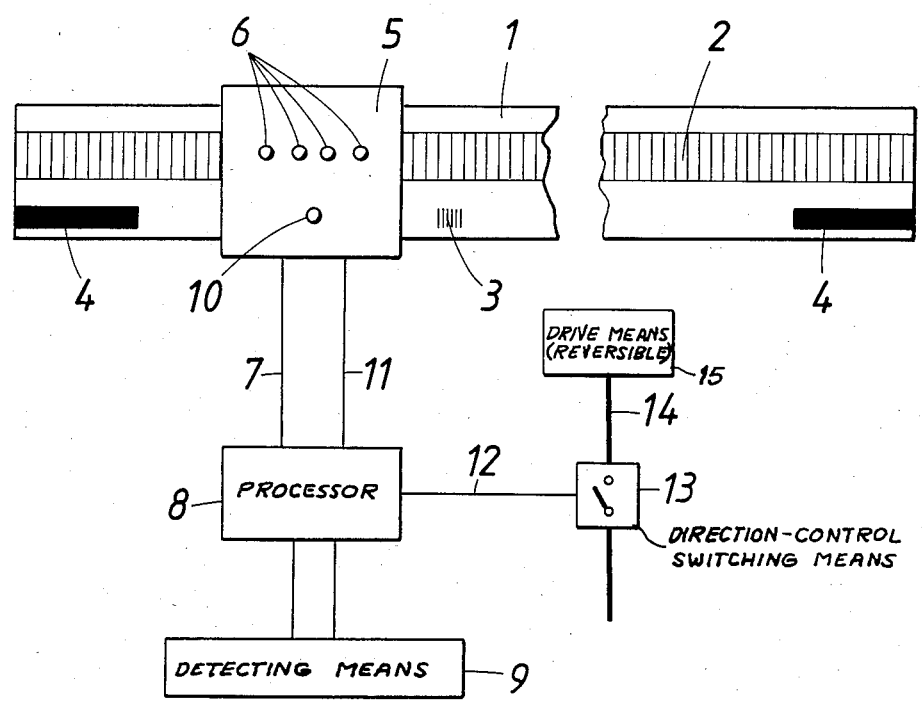

INCREMENTAL MEASURING AND MACHINE CONTROL SYSTEM

FIELD OF THE INVENTION

This invention relates to an incremental measuring and machine control system comprising a rule, which is provided with a scale, a scanning unit comprising means for scanning the scale and for generating analog signals in response to such scanning, a processor for deriving digital signals from the analog signals, switching means and switch control means for controlling said switching means.

The invention relates particularly to an incremental measuring and machine control system which is of the kind mentioned above and in which the rule is provided beside the scale with at least one auxiliary track having at least one reference mark, which registers with a predetermined point of the scale, and in which the scanning unit comprises additional scanning means, which serve to scan the auxiliary track and which in response to the scanning of the reference mark generates a reference signal, which causes the processor to control detecting means for counting or displaying said digital signals.

BACKGROUND OF THE INVENTION

Incremental measuring and machine control systems of the type mentioned above may serve to measure angles or lengths. In dependence on the nature of the scale and of the scanning unit, the scale and the reference mark or marks can be scanned by optoelectronic, inductive, magnetic or capacitive methods. In most cases the scanning of the scale results in a generation of basically sinusoidal analog signals, each complete period of which is associated with a complete increment of the scale. For an optoelectronic scanning, each complete scale increment comprises a bright field and a dark field and in the simplest case a graduation line and an empty field or free space. In the present case the term "incremental measuring system" is used to describe also absolute measuring systems having a plurality of coded scale tracks including an incremental scale track having the highest resolution. In most measuring and machine control systems of the present kind, the scanning results in the generation of at least two analog signals, which are displaced in phase, e.g. by 90°, and in dependence on the direction of the scanning movement performed by the scanning unit relative to the scale one of said signals or the other leads the other of said signals so that the direction of the scanning movement can be detected from said analog signals by a direction discriminator. In the processor, digital signals which can be counted are derived from the analog signals. This may be accomplished by means of trigger circuits detecting the zero crossings of the phase-displaced analog signals, and circuits for subdividing the scale increments electronically or by computation may be provided and may comprise a microprocessor or microcomputer. The digital signals can be counted and the resulting counts can be used in a display unit for displaying the instantaneous result of the measurement, which may be related to a selected zero point. The digital signals may also be used as control signals or position control signals in a path control system of a machine tool or can be used for monitoring and/or controlling the position of industrial robots.

The provision of one or more reference marks permits an absolute determination of one or more points of reference on the incremental scale. In response to a movement past a reference mark, the scanning unit generates a pulse which is associated with a specific scale increment and which is as long as, or shorter than, a signal that is derived from that scale increment. The reference signal may be used to initiate the operation of the processor or display unit or to set it or to reset it to zero. Under the control of the reference signal, a bidirectional counter of the processor may be set, started or stopped. The reference signal also permits the results of the measurement to be related to absolute points of referene so that the incremental measuring and machine control system operates as a virtually absolute system.

Incremental measuring and machine control systems of the kind described first hereinbefore are known from GB-B-2,065,872 and from DE-A-32 45 357. In these known measuring and machine control systems, a plurality of reference marks are provided in a common auxiliary track of the rule. Control marks, mechanical stops or permanent magnets are provided or can be attached to the rule in another auxiliary track, which is disposed in most cases on that side of the scale which is opposite to the reference marks. By means of said control marks and associated switching means, specific reference marks or reference signals derived from such reference marks can be selected from the large number of reference marks or reference signals which are provided so that only the selected reference signals are subjected to further processing. It is emphasized that in the prior art the control marks are used only to control the processor of the measuring system and do not perform additional functions.

In known path control systems for machine tools, the digital signals derived from the analog signals are utilized for a control. A computer may be used to define memory address ranges corresponding to workpiece portions which are to be machined by means of a tool and said memory address ranges may be related to absolute or selected points of a scale. In such an arrangement, the instantaneous position of the tool can be detected in dependence on the currently received digital signals and said digital signals can be used to adjust the tool to a desired position. In a known control system, a desired position to be reached by the tool is stored in a memory and the path length to be travelled by the tool until that desired position has been reached is computed. That path length to be traversed is also stored in a memory and the count resulting from the counting of the digital signals during the movement of the tool is compared with the count corresponding to the required path length. This operation is continued until the desired position has been reached. At that time the computer generates a signal for initiating the next operation. It is also known in connection with machine tools or robots to provide separate limit switches for defining certain positions of a tool slide, toolholder, carriage or saddle. Such limit switches may consist of mechanically actuated switches or of non-contacting switches, such as photodetectors, proximity switches or magnet-actuated reed relays. The limit switches which are additionally required increase the overall expenditure involved in the machine tool and often can be attached to the machine tool only with great difficulty. In many cases it is almost impossible to attach such limit switches to an existing machine or to alter the locations defined by such switches.

It is an object of the invention to provide an incremental measuring and machine control system which is of the kind described first hereinbefore and in which the measuring system is provided with simple means for controlling the functions of switching means of the machine control system, particularly the functions of limit switches.

SUMMARY OF THE INVENTION

This object is accomplished in that control marks provided on the rule beside the scale are scanned by means for controlling switching means of the machine control systems so that the switching means are controlled in response to the scanning of the rule by the scanning unit.

As a result, the need for additional limit switches and the difficulties involved in their attachment as well as the risks that such switches may become defective are eliminated. The switch control means may cooperate with the switching means in a non-contacting manner.

In a preferred embodiment of the incremental measuring system provided with reference marks, the control marks are provided on the same auxiliary track or tracks as the reference mark or marks and the processor comprises a discriminator, which is adapted to distinguish between reference signals derived from the reference marks and control signals derived from the control marks, and signals which are derived from the control marks, and signals said control signals to an output which is adapted to be coupled to switching means of the machine control system so that the control signals can be utilized in the machine control system as stopping or reversing or mode control signals.

The control marks may consist of marks or track sections which extend in uniform width along at least two scale increments.

In the simplest case the discriminator may comprise a change-over switch, by which a reference signal generated in response to the scanning of the auxiliary track will be delivered in the processor to a circuit for performing a control function in the measuring system if that signal is continued only during the scanning of not more than one scale increment, whereas a signal which is generated by the scanning unit in response to the scanning of the auxiliary track and is maintained for two or more scale increments or during a corresponding number of digital signals will be identified by the discriminator as a control signal and will be delivered to the control output of the measuring system or to a signal-shaping stage preceding said output. Without a need for a substantial increase of the circuitry expenditure and of the overall expenditure, a single auxiliary track, may be scanned for the generation of reference signals, which are utilized in the usual manner, and for the generation of control signals, which can be used in a machine control to stop or reverse the drive means or to change the mdoe of operation of the machine, in the manner in which signals generated by limit switches have been used before.

In most cases the control marks are provided on the rule during the manufacture thereof. But the control marks may alternatively consist of marks which are detachably mounted on the auxiliary track of the rule so that they can be mounted on the rule and changed in position as may be required.

BRIEF DESCRIPTION OF THE DRAWING

A measuring and machine control system in accordance with the invention is illustrated on the drawing in a highly diagrammatic manner.

DETAILED DESCRIPTION OF THE PREFERRED EMBODIMENT

A rule 1 is provided with an incremental scale 2. In addition to this scale 2, the ruler comprises an auxiliary track provided with a reference mark 3. In the embodiment shown by way of example, control marks 4 are provided on the auxiliary track near the ends of the rule in addition to the reference mark. The control marks cooperate with additinal scanning means to perform the functions of limit switches. The additional scanning means includes an optoelectronic scanning unit 5 with light receivers 6, which are illuminated through the scale 2 and through gratings, offset from each other along the scale by fractional parts of a scale increment. As a result, a scanning movement of the scanning unit 5 along the rule 1 will cause the scanning unit 5 to generate two basically sinusoidal analog signals, which are displaced in phase and are delivered via a line 7 to a processor 8. The latter derives direction-indicating signals and digital signals from the analog signals. The direction-indicating signals and digital signals may be used to control a counter or a display unit. The direction-indicating signals indicate the direction in which the scanning unit is moved along the rule 1.

In association with the auxiliary track, the scanning unit comprises a separate light receiver 10 and an associated grating so that a reference pulse will be generated by the scanning unit in a predetermined position of the last-mentioned grating relative to the reference mark 3. The reference pulse is delivered via a line 11 to the processor 8 and may be utilized therein to effect a starting, setting or stopping of the detecting means 9 consisting of a counter and a display unit. The processor 8 comprises also a discriminator, which is adapted to detect whether the illumination of the light receiver 10 is modified by the reference mark 10 or by one of the two control marks. This can be detected in that the number of digital signals are counted which are generated during the time in which the light receiver 10 receives the signal which is generated in response to the scanning of the reference mark 3 or either of the control marks 4. Which of the control marks 4 is being scanned will be indicated from the counting sense and from the count. A signal generated in response to the scanning of one of the control marks 4 is delivered by an additional output of the processor to a control line 12 and can be used to actuate a switch 13 incorporated in a line 14 for controlling a motor of the machine, e.g. the reversible drive means 15 which can be direction controlled by the switch 13 and have its energization controlled by the switching means 13.

We claim:

1. An incremental measuring and control system for use with a machine, said system comprising:
   a rule provided with an incremental scale having a plurality of scale increments and at least one auxiliary track extending along said scale alongside the incremental scale and provided with marks;
   a scanning unit movable along said scale and including first scanning means for scanning said scale and said auxiliary track and for generating analog signals in response to the scanning of said scale and additional signals in response to the scanning of said marks;

a processor for deriving digital signals from said analog signals;

switching means for controlling operations of said machine;

switch control means for controlling said switching means, said marks comprising control marks and at least one reference mark registering with a predetermined point of said scale, said switch control means comprising additional scanning means incorporated in said scanning unit and arranged to scan said auxiliary track and to control said switching means in response to the scanning of said control marks, said scanning unit being adapted to generate at least one reference signal in response to the scanning of said reference mark; and detecting means for detecting said digital signals from said processor, said processor being arranged to control said detecting means in response to said reference signal said additional scanning means being arranged to generate said at least one reference signal in response to the scanning of said reference mark, and control signals in response to the scanning of said control marks, said processor having a control output connected to said switching means and a discriminator arranged to receive and distinguish between said at least one reference signal and said control signals and to deliver said control signals to said control output.

2. The control system set forth in claim 1, wherein said switch control means and switching means are arranged to cooperate in a non-contacting manner.

3. The control system set forth in claim 1 as applied to a system which comprises mechanical drive means and in which said switching means are arranged to control the energization of said drive means.

4. The control system set forth in claim 1 as applied to a system which comprises reversible mechanical drive means and in which said switching means are arranged to control the direction of movement of said drive means.

5. The control system set forth in claim 1, wherein each of said control marks extends in constant width along at least two of said scale increments.

6. The central system set forth in claim 5 as applied to a system in which each of said reference marks extends along not more than one of said scale increments.

7. The control system set forth in claim 6 as applied to a system in which said processor is arranged to generate a predetermined number of said digital signals in response to the scanning of each of said scale increments, wherein said additional scanning means are arranged to generate said control signals as signals of constant amplitude and said discriminator is arranged to detect said control signals as signals having a constant amplitude for a time in which said digital signals are generated in a number corresponding to the scanning of a plurality of said scale increments.

8. The control system set forth in claim 1, wherein said control marks constitute integral portions of said at least one auxiliary track.

9. The control system set forth in claim 1 wherein said control marks are attached to said rule.

10. The control system set forth in claim 1, wherein said control marks are detachably attached to said rule.

11. In an incremental measuring system comprising:

a rule provided with an incremental scale having a plurality of scale increments and at least one auxiliary track extending along said scale beside the same and provided on said at least one auxiliary track with at least one reference mark registering with a predetermined point of said scale, a scanning unit which is movable along said rule and includes scanning means for scanning said scale and for generating analog signals in response to the scanning of said scale, and additional scanning means for scanning said at least one auxiliary track and for generating at least one reference signal in response to the scanning of said at least one reference mark, a processor for deriving digital signals from said analog signals and for receiving said at least one reference signal, and detecting means for detecting said digital signals from said processor under the control of said at least one reference signal, the improvement wherein:

said rule is provided with control marks in said at least one auxiliary track, said additional scanning means are arranged to generate control signals in response to the scanning of said control marks, said processor comprising a control output and a discriminator arranged to receive and to distinguish between said at least one reference signal and said control signals and to deliver said control signals to said control output, said processor being arranged to generate a predetermined number of said digital signals in response to the scanning of each of said increments and each of said reference marks extends along not more than one of said scale increments, each of said control marks extends in constant width along at least two of said scale increments, said additional scanning means are arranged to generate said control signals as signals of constant amplitude, and said discriminator is arranged to detect said control signals as signals having a constant amplitude for a time in which said digital signals are generated in a number corresponding to the scanning of a plurality of said scale increments.

* * * * *